Nov. 9, 1965   P. SAUTY   3,216,178
PROCESS FOR REGENERATING AN ADSORBENT BED
Filed July 20, 1962   3 Sheets-Sheet 1
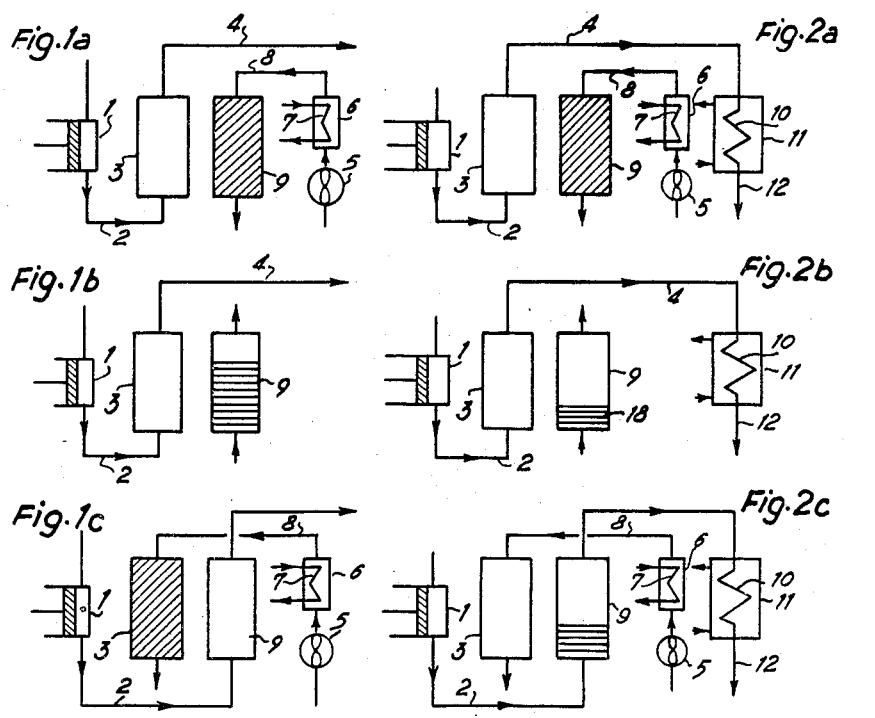
INVENTOR
PIERRE SAUTY
BY Irwin & Thompson
ATTORNEY

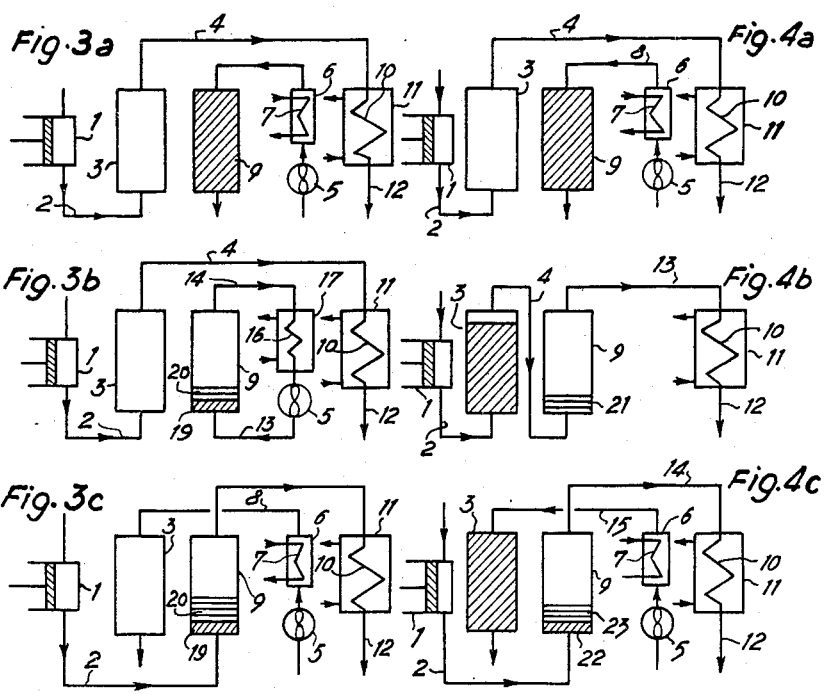

Nov. 9, 1965    P. SAUTY    3,216,178
PROCESS FOR REGENERATING AN ADSORBENT BED
Filed July 20, 1962    3 Sheets-Sheet 3

INVENTOR
PIERRE SAUTY
BY Irvin D. Thompson
ATTORNEY

United States Patent Office 3,216,178
Patented Nov. 9, 1965

3,216,178
PROCESS FOR REGENERATING AN
ADSORBENT BED
Pierre Sauty, Bagnolet, France, assignor to l'Air Liquide
Societe Anonyme Pour l'Etude et l'Exploitation des
Procedes Georges Claude
Filed July 20, 1962, Ser. No. 211,370
Claims priority, application France, Aug. 8, 1961,
PV 870,344
5 Claims. (Cl. 55—33)

The present invention relates to a process for regenerating an adsorbent bed charged with impurities during the purification of a gas, by flushing with a gas which is warmer than the gas to be purified, then cooling to its operational temperature by direct contact with a cold gas. It is more especially concerned with the purification of air containing carbon dioxide gas, moisture and hydrocarbons, particularly with a view to the separation thereof at low temperature by liquefaction and rectification. It can also be applied to the purification by adsorption of other gases containing less volatile impurities, such as hydrogen, helium or mixtures of hydrocarbons.

It is known that one of the most efficient processes for the removal of carbon dioxide from air consists in causing the air to pass in contact with an adsorbent material, such as silica gel or activated alumina, this operation generally taking place at a relative low temperature, for example in the region of −130° C.

When an adsorbent bed is too much charged with carbon dioxide gas for still effecting a sufficient purification of the air, it is taken out of circuit and regenerated, while the air to be purified is conducted on to another adsorbent bed, the regeneration of which has been effected during the operational period of the first bed. The most frequently employed method of regeneration consists in flushing the adsorbent with a gas free from carbon dioxide gas and sufficiently warm to produce the desorption of the carbon dioxide gas, this latter then being carried away by the stream of flushing gas; the adsorbent bed freed from carbon dioxide is then brought to its operational temperature by direct contact with a cold gas which is also free from carbon dioxide. One process of this type which limits the cold losses due to regeneration to a minimum is disclosed and claimed in U.S. Patent No. 2,882,998.

The known regeneration processes have certain disadvantages, because of the large volumes of the necessary flushing and cooling gases. For this purpose, in the case of purifying air, the general procedure is to use the nitrogen originating from its separation when oxygen is the only gas to be separated in the pure state. Nevertheless, there is now an increasing demand for a large part of the separated nitrogen in a high state of purity which is incompatible with its use as a gas for regenerating adsorbent beds charged with carbon dioxide gas. The quantity of nitrogen available for the regeneration of the adsorbent beds is thus limited to the fraction of this gas for which there do not exist strict purity standards and which is sometimes insufficient.

It is then necessary to replace the removal of carbon dioxide by adsorption by a removal of carbon dioxide by chemical means (washing with caustic soda), although it necessitates large equipment and enables only a lower degree of air purity to be obtained.

The process according to the invention allows the aforesaid disadvantages to be avoided and the absorbent beds charged with impurities to be regenerated without however contaminating a large volume of pure gas, and in particular of obtaining a large proportion of the nitrogen in a pure state, especially in the separation from air. It also makes it possible for the air to be simultaneously subjected to a drying and to the removal of traces of hydrocarbons, such as acetylene, as well as to the removal of carbon dioxide, whereas the drying at least was generally effected independently of the removal of carbon dioxide in the known processes. It comprises using as warm flushing gas an auxiliary stream of the impure gas and effecting the cooling of the regenerated adsorbent bed until a substantial zone of the adsorbent bed near the inlet end of the cooling gas is cooled to substantially the temperature of the main stream of gas to be purified.

The cold gas used for the cooling of the adsorbent bed may either be any available pure gas, for example nitrogen, in the case of purifying air, or the initially impure gas which has just been purified on a first adsorbent bed in operation, or a limited quantity of impure gas flowing in a closed cycle comprising a cooler. In the second case, it is preferred to use at least three adsorbent beds, and the adsorbent bed to be cooled is put in the circuit of gas to be purified, after an adsorbent bed which is in operation, still ensuring an efficient purification until a sufficient zone of the regenerated adsorbent bed, close to the inlet end of the gas to be purfied, has been cooled to its operational temperature.

The process according to the invention permits the periodic regeneration of the adsorbent beds for the removal of carbon dioxide from the air, whatever may be their operational temperature. It is expedient even if this temperature is in the region of the ambient temperature, this making it possible for the removal of carbon dioxide and the drying of the air to be carried out either at low pressure or at high pressure; the flushing gas must then be brought to a temperature appreciably higher than the ambient temperature, for example by flowing in contact with a steam coil. In particular, it permits the use as adsorbent of a synthetic crystalline zeolite, such as that known under the name of "molecular sieve 5 A."

Several methods of carrying the invention into effect as regards its application to the purification of air will hereinafter be described by reference to the accompanying drawing.

FIGURE 1 shows an operation for regenerating an adsorbent bed in which the cooling of the regenerated bed is provided by part of the separated nitrogen.

FIGURE 2 shows a similar method of regeneration to that shown FIGURE 1, but in which the flow of nitrogen in contact with the adsorbent to be cooled is interrupted when a sufficient zone of the inlet end for the air is at its operational temperature, the completion of the cooling being assured by the actual air to be purfied.

FIGURE 3 shows a regenerating operation of an adsorbent bed, in which the initial part of its cooling is provided by a stream of unpurified air flowing in a closed circuit, the continued cooling being provided by the air to be purified.

FIGURE 4 represents a regenerating operation of an adsorbent bed, in which the initial cooling phase is provided by the stream of air to be separated which leaves in a purified state an adsorbent bed which is still operating, and the continued cooling being effected by the same air not previously purified.

Figure 5A:
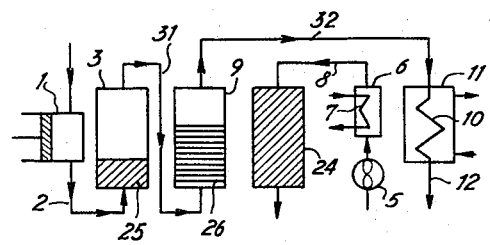
FIGURE 5 represents a regenerating operation of an adsorbent bed comprising a set of three beds in ternary permutation, the air to be purified successively passing through the operating bed and then a bed which is being cooled.

In all these figures, the zones of the adsorbent beds which are charged with impurities are shown diagrammatically by oblique cross-hatching; the regenerated and cooled zones are represented by horizontal cross-hatching.

The regeneration of the adsorbent bed shown in FIG-

URE 1 comprises the three phases a, b and c. In the phase a, while the adsorbent bed 3 is still in operation, the adsorbent bed 9 is being regenerated by reheating. The air to be purified, compressed by the compressor 1 to about 6 kg./cm.² and cooled in a water-cooler (not shown) passes through the conduit 2 into the operational adsorbent bed 3, formed for example by activated alumina, and leaves the latter free from carbon dioxide and dried by way of the conduit 4; on the other hand, a fan 5 drives an auxiliary stream of ambient air not freed from carbon dioxide through the reheater 6 with a steam coil 7, while brings it to about 100° C., and the pipe 8 into the adsorbent bed 9 in the direction of the air to be purified. When the adsorbent bed 9 is completely reheated, all of it is brought back to its operational temperature, close to ambient temperature, by a stream of separated nitrogen passing in contact therewith. The cooled adsorbent bed 9 is then put into service again by connecting it to the outlet of the compressor 1, while the adsorbent bed 3 charged with carbon dioxide gas and moisture and possibly a small quantity of hydrocarbons, is subjected to regeneration by the passage of hot air originating from the fan 5 and the reheater 6.

According to the modification shown in FIGURE 2, the flow of cold nitrogen in contact with the adsorbent bed regenerated by reheating is only pursued to the stage of cooling a zone 18 at the end of the absorbent bed through which the air to be purified must enter, the remainder of the adsorbent bed only being slightly cooled or not cooled at all. The air to be purified is then introduced through this same end (FIGURE 2c). It is freed from carbon dioxide and dried while passing through the cooled zone, and then provides the cooling of the layers of the adsorbent bed further from the inlet. It is for this reason strongly reheated; by passing through the coil 10 embedded in a water cooler 11, the recooling thereof to ambient temperature is assured before it leaves by way of the pipe 12 to the liquefaction apparatus proper. The successive layers of the adsorbent are thus cooled gradually until all the adsorbent is restored to its operational temperature. The auxiliary cooling of the treated air in the cooler 11 can then be interrupted.

In the method of regeneration and cooling as shown in FIGURE 3, the adsorbent bed 9 charged with impurities is first of all reheated by passing in contact with an auxiliary stream of unpurified air delivered by the fan 5 and reheated in the reheater 6. When the desorption of the impurities is ended, air delivered by the fan 5 into the conduit 13 (FIGURE 3b) is caused to flow through the same adsorbent bed, but in the opposite direction. This air leaves by way of the conduit 14 at a temperature close to the regeneration temperature of the adsorbent; it is then cooled by passing through the coil 16 immersed in a water cooler 17, then recycled by the fan 5 and the conduit 13 towards the adsorbent bed. After a short time, the adsorbent zone near the inlet end (19, 20) is cooled to the region of its operational temperature, and it then adsorbs at 19 the limited quantity of carbon dioxide gas and moisture present in the air of the cycle. As soon as the cooled zone has reached a sufficient thickness, the adsorbent bed is again set in operation. The air to be purified is freed from its impurities while it is passing through the cooled zone 20, and then cools the still hot layers of the adsorbent (FIGURE 3c). It leaves the adsorbent bed in a strongly heated condition; it is brought back to its initial temperature in the coil 10 of the water cooler 11. When the cooling of the adsorbent to its operational temperature is completed, the auxiliary cooling of the air in the water cooler 11 can be interrupted.

In accordance with the method shown in FIGURE 4, the adsorbent bed charged with carbon dioxide gas and moisture is first of all heated to a temperature permitting the desorption of the adsorbed impurities by a stream of hot air from which carbon dioxide has not been removed (FIGURE 4a). When all the adsorbent bed 9a reaches this temperature, it is put in the circuit of air to be purified, behind the operating adsorbent bed 3 which is still not saturated with impurities. The air purified in passing through the adsorbent bed 3 cools the bed 9 while being reheated and while carrying along the small quantity of impurities present in the interstices of the grains of adsorbent; it is then cooled in the coil 10 immersed in the water cooler 11 before being returned to the apparatus through the conduit 12.

When a sufficient zone 21 at the inlet end of the adsorbent bed 9 is returned to its operational temperature, the air to be purified is caused to reach the bed 9 directly, while the regeneration of the substantially saturated bed 3 is started by sending hot air to it in the same manner as before. The cold zone 21 of the adsorbent bed 9 adsorbs the carbon dioxide gas and the moisture of the air to be purified at 22, which then cools at 23 the still hot layers of the adsorbent while being reheated on contact therewith; it is then brought back to its initial temperature in the water cooler 11. When the cooling of the adsorbent bed 9 is complete, the auxiliary cooling of the air in the cooler can be stopped.

It will be noted that in this case, at the moment when the adsorbent bed 9 which is regenerated but still not cooled is traversed by the purified air leaving the adsorbent mass 3, this latter air carries along a small quantity of impurities. However, the period of time during which the leaving air contains a small quantity of impurities is quite short; the carbon dioxide gas content of the leaving air, which is for example 70 parts per million (p.p.m.) at the start, falls very rapidly to the region of 0. The passage in the other parts of the separation installation of this small quantity of impurities of the air does not present any major inconvenience; it can moreover be checked by conventional means, for example filters, at a temperature level where these impurities are solid. This inconvenience can moreover be completely avoided by using a set of three adsorbent beds in ternary permutation, as shown in FIGURE 5. In this case, the air compressed in the compressor 1 is introduced in a first period (FIGURE 5a) through the conduit 2 into the operational adsorbent bed 3 (already saturated with impurities in the zone 25), then through the pipe 31 into an adsorbent bed 9 which is being cooled (already cooled in the zone 26); finally, it passes through the conduit 32 into the coil 10 of a water cooler 11, and is returned through the conduit 12 to the cooling exchangers. The third adsorbent mass 24 is regenerated as already described by means of atmospheric air delivered by a fan 5 into a reheater 6 having a steam coil 7, and then through the conduit 8 into the adsorbent bed. When the adsorbent bed 9 is completely cooled, the cooling of the air in the cooler 11 is stopped, this bed remaining in series with the bed 3 and permitting the purification to be completed.

Figure 5B:
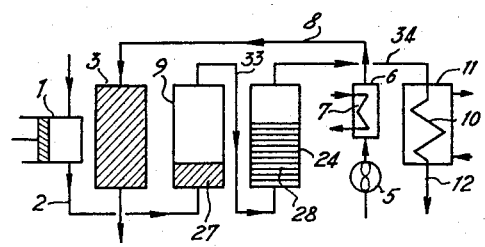
Figure 5C:
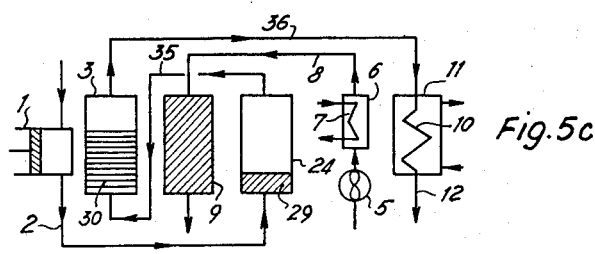

When the adsorbent bed 3 is saturated with impurities, the three beds are interchanged (FIGURE 5b). While the bed 3 is subjected to the regeneration by reheating, the air to be purified is introduced into the bed 9, and then from thence through the conduit 33 into the regenerated bed 24 to be cooled. As before, a zone 27 saturated with impurities is formed in the bed 9 and a cooled zone 28 is formed in the bed 24, both zones progressing from the inlet end towards the outlet end.

When the adsorbent bed 24 is completely cooled and the bed 9 is saturated with impurities, the three beds are again interchanged. The bed 9 is subjected to the regeneration by reheating, while the air to be purified is introduced into the cooled bed 24, and from thence through the conduit 35 into the regenerated bed 3 which is to be cooled. During this third period, the bed 24 is progressively charged with impurities (zone 29) and the bed 3 is progressively cooled (zone 30). When the bed 3 is completely cooled and the bed 24 is saturated with impurities, the bed 9 being on the other hand regenerated, a fresh interchange restores the adsorbent beds to the arrangement shown in FIGURE 5a.

What I claim is:

1. A process for regenerating an adsorbent bed charged with impurities during the purification of a main stream of an impure first gas, comprising the steps of:
   (a) warming up an auxiliary stream of said impure first gas and flushing said adsorbent bed with said warmed-up auxiliary stream until said impurities are desorbed and carried out of said adsorbent bed to produce a regenerated adsorbent bed,
   (b) flowing through said regenerated adsorbent bed a stream of a cooling gas of substantially the same temperature as that of said impure first gas until a substantial zone only of the adsorbent bed near the inlet end of said cooling gas into said adsorbent bed is cooled to substantially the temperature of said main stream of impure first gas, and
   (c) flowing again said main stream of impure first gas into said adsorbent bed through its cooled zone, thereby cooling the remainder of said adsorbent bed to substantially the temperature of said main stream, and purifying said main stream.

2. A process according to claim 1, wherein said purified main stream of first gas flowing out of the adsorbent bed during step (c) is cooled again by indirect heat exchange.

3. A process for regenerating an adsorbent bed charged with impurities during the purification of a main stream of an impure first gas, comprising the steps of:
   (a) warming up an auxiliary stream of said impure first gas and flushing said adsorbent bed with said warmed up auxiliary stream until said impurities are desorbed and carried out of said adsorbent bed to produce a regenerated adsorbent bed,
   (b) flowing through said regenerated adsorbent bed a stream of a pure cooling gas separated from said purified first gas and of substantially the same temperature as that of said main stream of said impure first gas, until a substantial zone only of the adsorbent bed near the inlet end of said cooling gas into said adsorbent bed is cooled to substantially the temperature of said main stream of impure first gas, and
   (c) flowing again said main stream of impure first gas into said adsorbent bed through its cooled zone, thereby cooling the remainder of said adsorbent bed to substantially the temperature of said main stream and purifying said main stream.

4. A process for regenerating an adsorbent bed charged with impurities during the purification of a main stream of an impure gas, comprising the steps of
   (a) warming up a first auxiliary stream of said impure gas and flushing said adsorbent bed with said warmed-up auxiliary stream until said impurities are desorbed and carried out of said adsorbent bed to produce a regenerated adsorbent bed,
   (b) flowing through said regenerated adsorbent bed a second auxiliary stream of said impure gas, of substantially the same temperature as that of said main stream of impure gas, then cooling said second auxiliary stream withdrawn from said adsorbent bed and recycling it again through said adsorbent bed, until a substantial zone only of the adsorbent bed near the inlet end of said cooling gas into said adsorbent bed is cooled to substantially the temperature of said main stream of impure first gas, and a minor portion of said substantial zone of the adsorbent bed, next to the inlet end of said cooling gas, is charged with the impurities of said second auxiliary stream, and
   (c) flowing again said main stream of impure first gas into said adsorbent bed through its cooled zone, thereby cooling the remainder of said adsorbent bed to substantially the temperature of said main stream, and purifying said main stream.

5. A process for regenerating an adsorbent bed charged with impurities during the purification of a main stream of an impure first gas, comprising the steps of:
   (a) warming up an auxiliary stream of said impure first gas and flushing the adsorbent bed with said warmed-up auxiliary stream until said impurities are desorbed and carried out of said adsorbent bed to produce a regenerated adsorbent bed,
   (b) flowing through said regenerated adsorbent bed said purified main stream until a substantial zone only of the adsorbent bed near the inlet end of said main stream into said adsorbent bed is cooled to substantially the temperature of said purified main stream, and
   (c) flowing again said main stream of impure gas into said adsorbent bed through its cooled zone, thereby cooling the remainder of said adsorbent bed to substantially the temperature of said main stream of impure gas, and purifying said main stream of impure gas.

References Cited by the Examiner

UNITED STATES PATENTS

| 2,699,837 | 1/55 | Van Note | 55—33 X |
| 2,882,243 | 4/59 | Milton | 55—75 |
| 2,919,764 | 1/60 | Dillman et al. | 55—180 |
| 3,006,438 | 10/61 | De Yarmett | 55—180 X |
| 3,080,692 | 3/63 | Staley et al. | 55—181 X |
| 3,186,144 | 6/65 | Dow | 55—62 |

OTHER REFERENCES

Dow, Willard M., Vapor Phase Adsorption in Gas Processing. In Advance in Petroleum Chemistry and Refining. Volume IV, pages 93–97 relied on. November 1961, TP6 90 A$_3$ C.2.

REUBEN FRIEDMAN, *Primary Examiner.*